(12) United States Patent
Tomita

(10) Patent No.: US 10,883,557 B2
(45) Date of Patent: Jan. 5, 2021

(54) DAMPER

(71) Applicant: NIFCO INC., Yokosuka (JP)

(72) Inventor: Shigemitsu Tomita, Yokosuka (JP)

(73) Assignee: NIFCO INC., Yokosuka (JP)

( * ) Notice: Subject to any disclaimer, the term of this patent is extended or adjusted under 35 U.S.C. 154(b) by 6 days.

(21) Appl. No.: 16/341,197

(22) PCT Filed: Aug. 31, 2017

(86) PCT No.: PCT/JP2017/031347
§ 371 (c)(1),
(2) Date: Apr. 11, 2019

(87) PCT Pub. No.: WO2018/079064
PCT Pub. Date: May 3, 2018

(65) Prior Publication Data
US 2019/0249739 A1    Aug. 15, 2019

(30) Foreign Application Priority Data
Oct. 26, 2016 (JP) .................... 2016-209386

(51) Int. Cl.
*F16F 9/02* (2006.01)
*F16F 11/00* (2006.01)
(Continued)

(52) U.S. Cl.
CPC .............. *F16F 7/09* (2013.01); *F16F 9/00* (2013.01); *F16F 9/02* (2013.01); *F16F 9/0218* (2013.01);
(Continued)

(58) Field of Classification Search
CPC .... F16F 7/08; F16F 7/082; F16F 7/085; F16F 7/09; F16F 7/095; F16F 9/368; F16F 9/512; F16F 9/516; F16F 9/3214; F16F 9/3235
(Continued)

(56) References Cited

U.S. PATENT DOCUMENTS 3,357,319 A * 12/1967 Hagerty ................. F16D 65/18
                                                        92/245
4,560,174 A * 12/1985 Bisi ...................... B62D 55/088
                                                        277/382
(Continued)

FOREIGN PATENT DOCUMENTS

JP       S56-62462 U     5/1981
JP       2004-169766 A   6/2004
(Continued)

OTHER PUBLICATIONS

PCT/ISA/210, "International Search Report for International Application No. PCT/JP2017/031347," dated Oct. 10, 2017.

*Primary Examiner* — Christopher P Schwartz
(74) *Attorney, Agent, or Firm* — Manabu Kanesaka

(57) ABSTRACT

A damper includes a piston provided with a rod, and a housing storing the piston, and generates a braking force by an operation of the piston. The piston includes a seal member relative to an inner wall of the housing; and a slider contacting the inner wall of the housing with a predetermined frictional force. When the braking force is generated, the slider presses against the seal member, and a portion contacting the inner wall of the housing in the seal member deforms toward an outside of the housing. At an inner side of the portion contacting the inner wall of the housing in the seal member, a deformation control portion is provided, which suppresses the seal member from deforming toward an inside of the housing.

7 Claims, 12 Drawing Sheets

(51) Int. Cl.
*F16F 7/09* (2006.01)
*F16F 9/512* (2006.01)
*F16F 9/36* (2006.01)
*F16F 9/516* (2006.01)
*F16J 15/3236* (2016.01)
*F16F 9/00* (2006.01)
*F16J 15/3248* (2016.01)
*F16J 15/3204* (2016.01)

(52) U.S. Cl.
CPC ............... *F16F 9/36* (2013.01); *F16F 9/368* (2013.01); *F16F 9/512* (2013.01); *F16F 9/516* (2013.01); *F16J 15/3204* (2013.01); *F16J 15/3236* (2013.01); *F16J 15/3248* (2013.01); *F16F 2222/04* (2013.01); *F16F 2222/12* (2013.01); *F16F 2224/02* (2013.01); *F16F 2224/025* (2013.01); *F16F 2228/066* (2013.01); *F16F 2230/30* (2013.01); *F16F 2232/08* (2013.01)

(58) Field of Classification Search
USPC ....... 188/271, 322.16–322.18; 267/196, 205, 267/207; 277/322, 382
See application file for complete search history.

(56) References Cited

U.S. PATENT DOCUMENTS

| | | | |
|---|---|---|---|
| 9,850,975 B2* | 12/2017 | Tomita | ...................... F16F 7/09 |
| 2012/0085554 A1* | 4/2012 | Gette | ...................... E21B 33/04 |
| | | | 166/387 |
| 2012/0175830 A1* | 7/2012 | Yang | ...................... F16F 9/516 |
| | | | 267/140.13 |
| 2017/0002886 A1* | 1/2017 | Tomita | .................. F16F 9/0218 |
| 2017/0009837 A1 | 1/2017 | Saito | |

FOREIGN PATENT DOCUMENTS

| | | |
|---|---|---|
| WO | 2015/093548 A1 | 6/2015 |
| WO | 2015114885 A1 | 8/2015 |

* cited by examiner

DAMPER

FIELD OF TECHNOLOGY

The present invention relates to an improvement of a damper.

BACKGROUND ART

As for a damper comprising a piston provided with a rod and a housing storing the piston, and generating a braking force by an operation of the piston, there is a damper shown in Patent Document 1 previously disclosed by the present applicant.

In the damper of the Patent Document 1, the piston is provided with a seal member relative to an inner wall of the housing, and a slider contacting the inner wall of the housing with a predetermined frictional force. Then, when the braking force is generated, the slider presses against the seal member, and a portion contacting the inner wall of the housing in the seal member deforms outwardly toward the housing.

However, in the damper of the Patent Document 1, the portion contacting the inner wall of the housing in the seal member when the braking force is generated has a skirt shape and extends toward a forward-moving end side of the piston, so that as shown in FIG. 14, there is a case of generating a buckling F in which an inner side of a housing H is a bending outside. Such buckling F easily occurs when a high load acts on a piston P, and such buckling F easily occurs when an outer frame shape in a cross section of the housing H in a direction orthogonal to a moving direction of the piston P is made flat. When such buckling F occurs, a seal property between a seal member S and the housing H is reduced, and ventilation to a chamber C cannot be controlled. Also, a frictional force to an inner wall of the housing H of the seal member S is reduced, so that a rapid reduction of the braking force of the damper occurs. Typically, in a case wherein such buckling occurs, a subject to be braked quickly moves and stops alternately.

PRIOR ART DOCUMENT

Patent Document

Patent Document 1: International Publication No. 2015/93548

SUMMARY OF THE INVENTION

Problems to be Solved by the Invention

A main object of the present invention is to reasonably provide a structure which can continue to provide a uniform braking force through an entire movement thereof relative to the subject to be braked to this type of damper.

Means for Solving the Problems

In order to obtain the aforementioned object, in the present invention, a damper comprises a piston provided with a rod; and a housing storing the piston, and generates a braking force by an operation of the piston. The aforementioned piston is provided with a seal member relative to an inner wall of the housing; and a slider contacting the inner wall of the housing with a predetermined frictional force, and when the braking force is generated, the slider presses against the seal member, and a portion contacting the inner wall of the housing in the seal member deforms toward an outside of the housing. Also, in an inner side of the portion contacting the inner wall of the housing in the seal member, there is provided a deformation control portion which suppresses a deformation of the seal member toward an inner side of the housing.

According to such a structure, when the braking force is generated, the deformation control portion can suppress the deformation of the seal member toward the inner side of the portion contacting the inner wall of the housing so as to continue to provide a uniform braking force through an entire movement thereof relative to a subject to be braked.

In one of the aspects of the present invention, the deformation control portion suppresses the deformation by contacting at least at a position which becomes a center in a direction along a moving direction of the piston in the portion contacting the inner wall of the housing of the seal member at a time of the deformation.

Also, in one of the aspects of the present invention, the deformation control portion is integrally provided with the slider.

Also, in one of the aspects of the present invention, the deformation control portion is integrally provided with the seal member.

Also, in one of the aspects of the present invention, an outer frame shape in a cross section of the housing in a direction orthogonal to a moving direction of the piston is made flat.

Effect of the Invention

According to the present invention, the structure which can continue to provide the uniform braking force through the entire movement thereof relative to the subject to be braked, can be reasonably provided to this type of damper.

BEST MODES OF CARRYING OUT THE INVENTION

Figure 1:
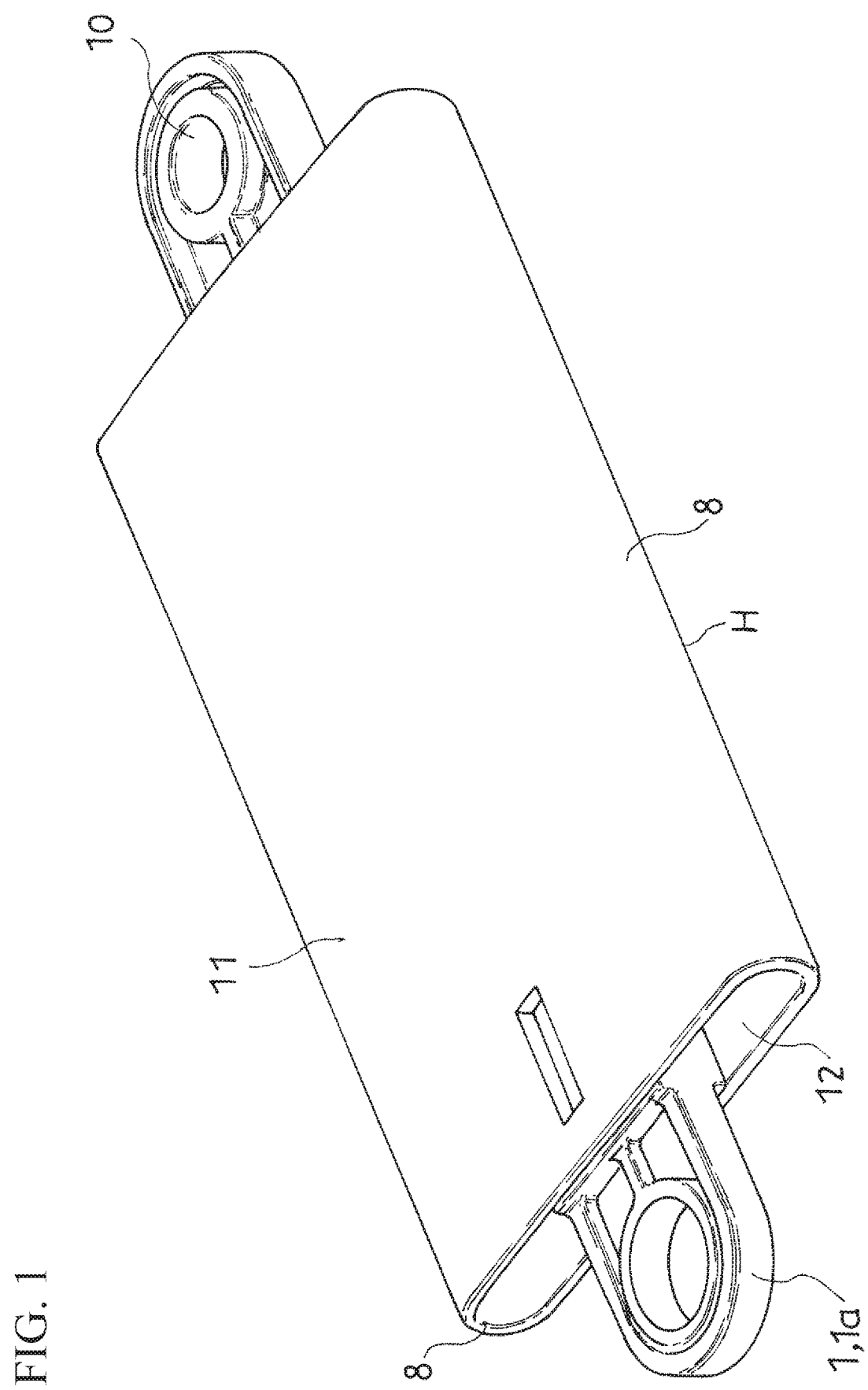
FIG. 1 is a perspective view of a damper according to one embodiment of the present invention.

Hereinafter, based on FIG. 1 to FIG. 13, typical embodiments of the present invention will be explained. A damper according to the embodiments generates a braking force for an operation of a piston P forming the damper, i.e. a movement or a relative movement of such piston P. Typically, the damper is combined with an article provided with a movable portion or the like (omitted in the drawings) which becomes a subject to be braked, and used for applying the braking force relative to a movement of such subject to be braked so as to move such subject slowly and properly, with a feeling of a high quality, or prevent such subject to be braked from moving extraordinarily.

Figure 6:
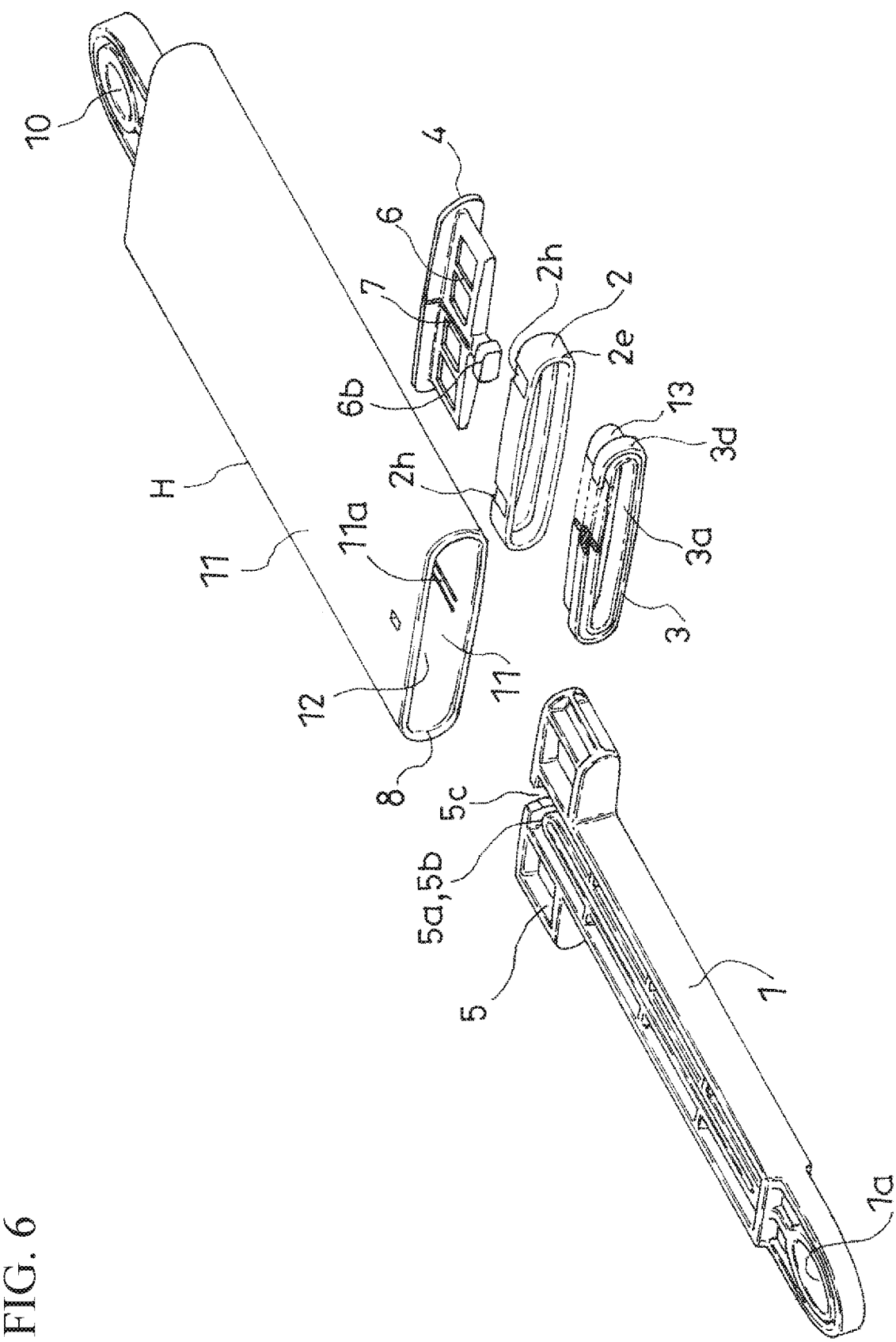
FIG. 6 is an exploded perspective view of the damper.

As shown in FIG. 6, such damper comprises the piston P provided with a rod 1; and a housing H storing the piston P. Typically, such damper directly or indirectly links either one of the rod 1 or the housing H on a side of the aforementioned subject to be braked, and directly or indirectly links the other of the rod 1 or the housing H on a side movably supporting such subject to be braked so as to be combined with the article provided with such subject to be braked.

The aforementioned housing H has a cylindrical shape opening one end and closing the other end. In illustrated examples, as shown in FIG. 6, such housing H has a flat cylindrical shape wherein a thickness thereof is made notably small. More specifically, in the illustrated examples, in such housing H, a cross section orthogonal to a cylinder shaft thereof has substantially a rectangular shape. Side walls 8 forming a thickness side of the housing H have a shape with a curvature wherein the outside of the housing H becomes the outside of the curvature. Outside a blocking end 9 of the housing H, there is formed a bracket portion 10 for the aforementioned linking.

Figure 2:
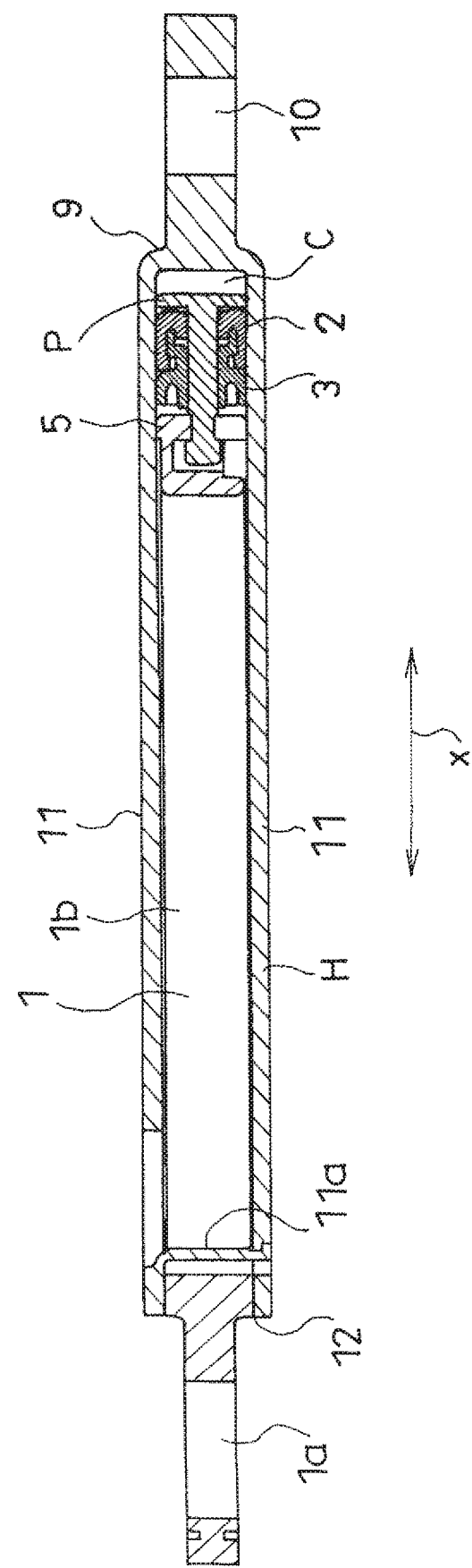
FIG. 2 is a cross-sectional structural view of the damper.

As shown in FIG. 2 and FIG. 6, the aforementioned rod 1 has a long rod shape in a moving direction of the piston P. On one end positioned outside the housing H in the rod 1, there is formed a bracket portion 1a for the aforementioned linking. The reference symbol 1b in the drawings represents a long hole along a lengthwise direction of the rod formed at a position approximately in a middle in a width direction of the rod, and as shown in FIG. 2, in the illustrated examples, a retainer piece 11a formed in one of side walls 11 forming a width side of the housing H is bent, and a tip side of the retainer piece 11a engages the other of the side walls 11 forming the width side of the housing H through the long hole 1b so as to prevent the rod 1 from coming out of the housing H.

The aforementioned piston P is provided with a seal member 2 relative to an inner wall of the housing H; and a slider 3 provided slidably in the moving direction of the piston P, and contacting the inner wall of the housing H with a predetermined frictional force.

In the illustrated examples, the piston P is provided with a first flange 4 facing the blocking end 9 of the housing H; and a second flange 5 retaining the seal member 2 and the slider 3 between the second flange 5 and the first flange 4. The second flange 5 is positioned at a back side of the first flange 4, i.e. on an open end 12 side of the housing H. In both the first flange 4 and the second flange 5, an outer frame shape in a cross section in a moving direction x of the piston P shown in FIG. 2, i.e. in a direction orthogonally in a direction along the cylinder shaft of the housing H, has a shape which becomes a complementary shape to an inner frame shape in the cross section of the housing H in the same direction. Thereby, the piston P is guided by the inner wall of the housing H so as to reciprocate in the direction along the cylinder shaft of the housing H.

Figure 7:
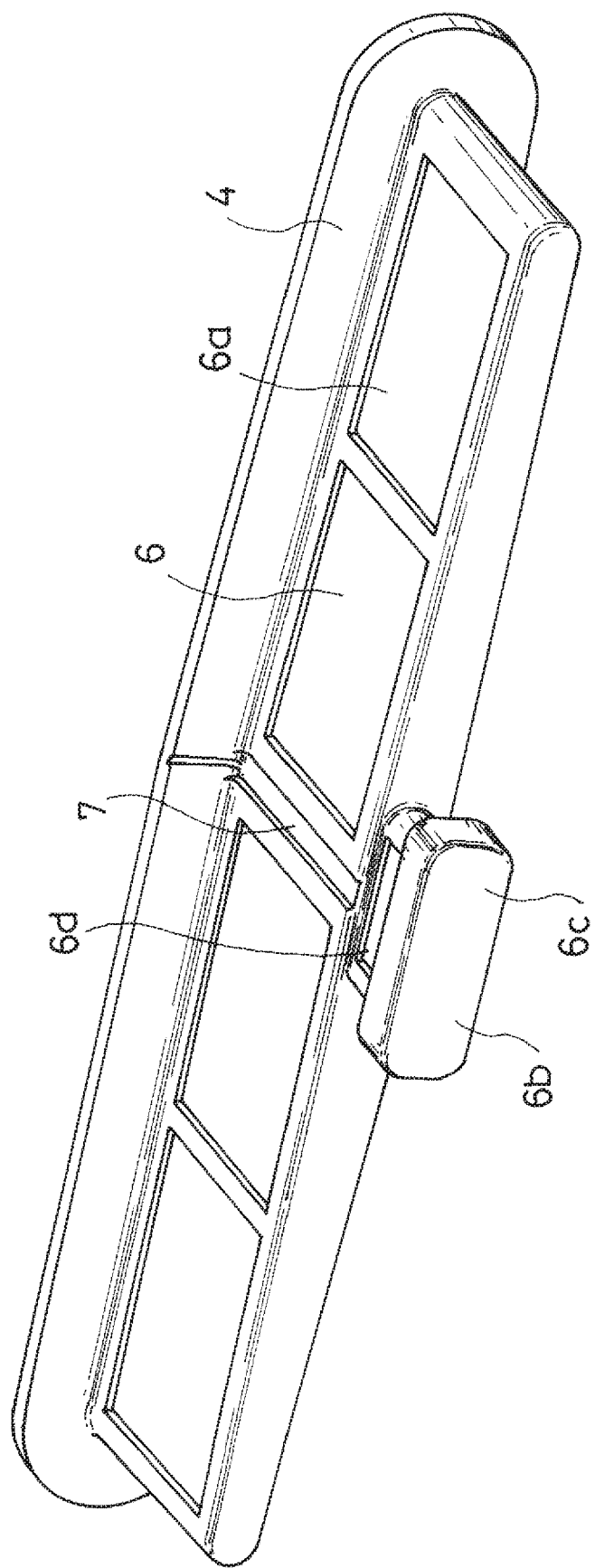
FIG. 7 is a perspective view of a head part forming the piston of the damper.
Figure 8:
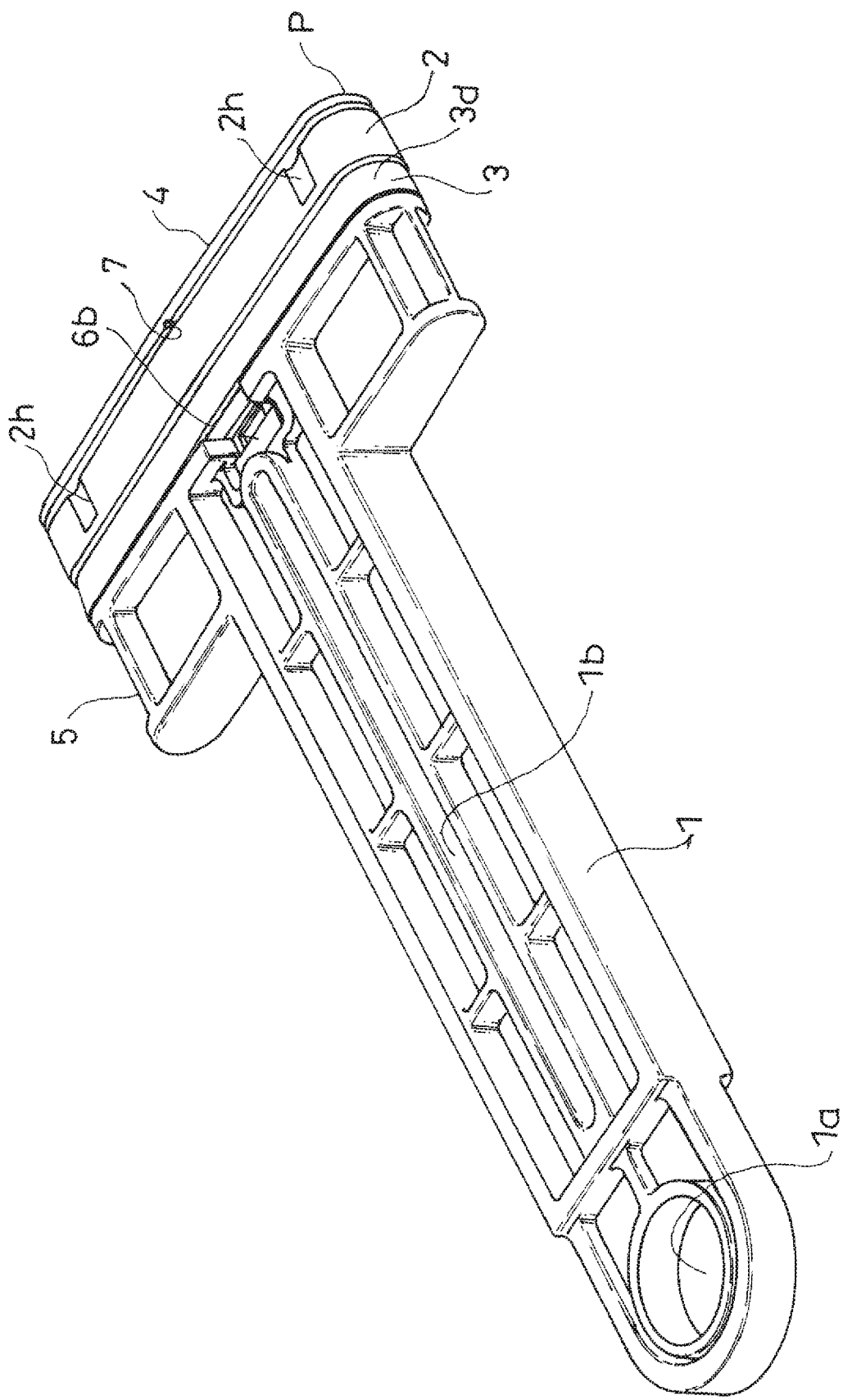
FIG. 8 is a perspective view of the piston of the damper.

In the illustrated examples, as shown in FIG. 6, the second flange 5 is formed in the other end of the rod 1. The first flange 4 is formed in a head part 6 which is a separate member from the rod 1. As shown in FIG. 7, the head part 6 includes a plate-like trunk portion 6a with a plate face facing the side walls on the width side of the housing H. On a side facing the blocking end 9 of the housing H in the trunk portion 6a, there is integrally formed the first flange 4 positioning a flange end outwardly more than an outer face of the trunk portion 6a at each position around the trunk portion 6a. Also, in a portion which is an end portion facing the open end 12 of the housing H in the trunk portion 6a, and positioned on the cylinder shaft of such housing H, there is formed a male joint portion 6b formed by a head portion 6c and a neck portion 6d, and integrated with the trunk portion 6a through the neck portion 6d. As shown in FIG. 6, in a portion positioned on the cylinder shaft of the housing H in the second flange 5, there is formed a female joint portion 5a formed by a first concave portion 5b receiving and retaining the head portion 6c of the male joint portion 6b; and a second concave portion 5c receiving and retaining the neck portion 6c of the male joint portion 6b, and opening outwardly at an end portion facing the blocking end 9 of the housing H in the second flange 5. In the present embodiment, from a state wherein the seal member 2 and the slider 3 respectively having a flat ring shape are combined with the head part 6 in such a way so as to surround the trunk portion 6a of the head part 6, the male joint portion 6b of the head part 6 is fitted into the female joint portion 5a of the second flange 5 so as to form the piston P formed by retaining the seal member 2 and the slider 3 between such first flange 4 and second flange 5.

Typically, the seal member 2 is formed by rubber or plastic having a rubber-like elasticity, and has the flat ring shape. The truck portion 6a of the head part 6 is inserted to pass through the inside of the seal member 2 from a side of the male joint portion 6b so that such head part 6 and seal member 2 are combined.

Figure 3:
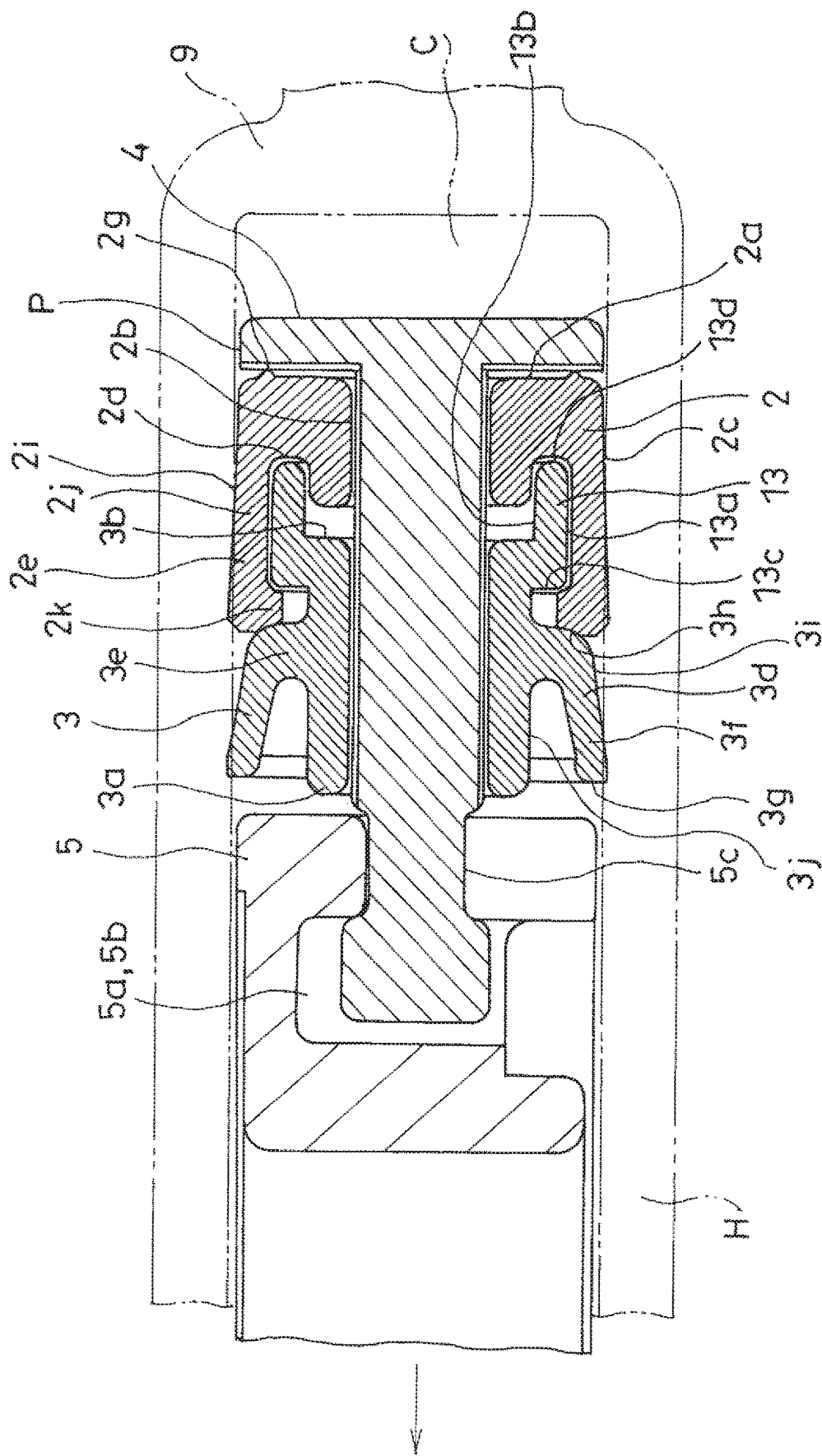
FIG. 3 is an enlarged cross-sectional structural view of essential parts of the damper, and shows a state when a piston moves forward.
Figure 4:
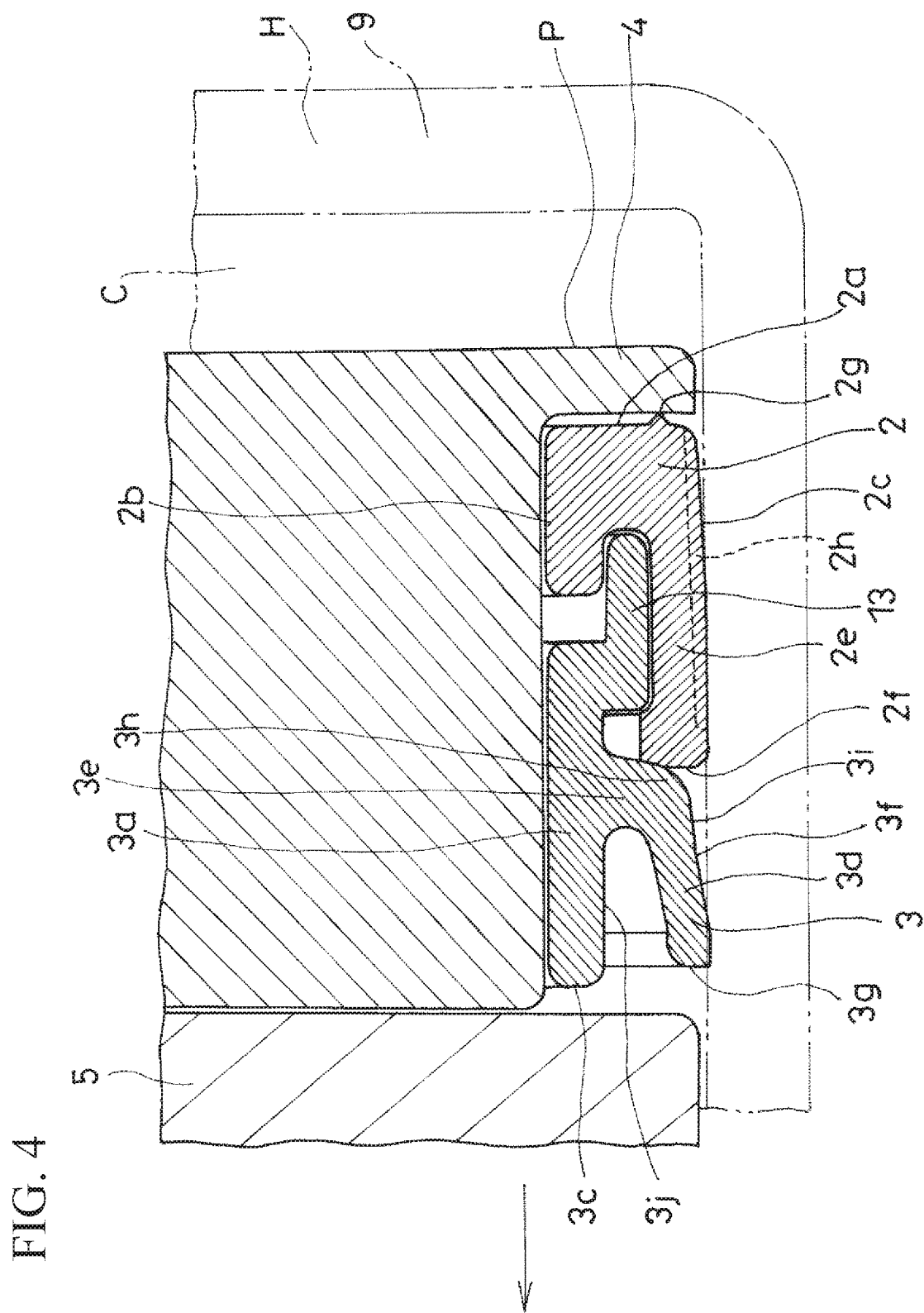
FIG. 4 is an enlarged cross-sectional structural view of the essential parts of the damper, and shows a state when the piston moves forward.

In the illustrated examples, as shown in FIG. 3, the seal member 2 includes a front end portion 2a relative to the first flange 4; an inner face portion 2b relative to an outer face of the trunk portion 6a of the head part 6; and an outer face portion 2c relative to the inner wall of the housing H. Also, on a side facing the open end 12 side of the housing H in the seal member 2, there is formed a circumferential groove 2d between the inner face portion 2b and the outer face portion 2c. An outer face portion 2c side sandwiching the circumferential groove 2d extends toward the open end 12 side of the housing H throughout all circumferential directions of the seal member 2 so as to have a circumferential belt shape surrounding the cylinder shaft of the housing H. Thereby, the seal member 2 is provided with a skirt-shaped portion 2e, and the outer face portion 2c of the seal member 2 increases a size more than the inner face portion 2b in the moving direction x of the piston P. As shown in FIG. 4, the outer face portion 2c of the seal member 2 inclines in a direction of gradually increasing a thickness of the seal member 2 as moving from the front end portion 2a to a terminal 2f of the skirt-shaped portion 2e. Also, on the front end portion 2a of the seal member 2, there is formed a circumferential projection piece 2g. Incidentally, in the illustrated example, on an outer face of the seal member 2, there are formed grooves 2h along the moving direction x of the piston P respectively on right and left sandwiching the cylinder shaft of the housing H in a portion contacting the side walls 11 forming the width side of the housing H (see FIG. 6 and FIG. 8).

Figure 9:
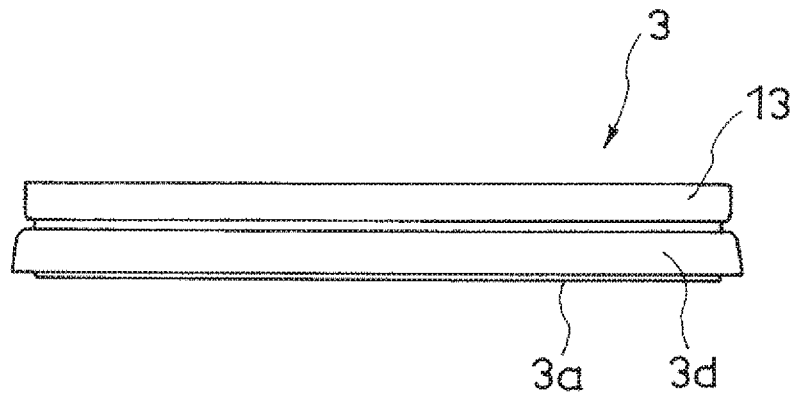
FIG. 9 is a side view of a slider forming the piston of the damper.

As shown in FIG. 9, typically, the slider 3 is formed by the plastic, and has the flat ring shape. As mentioned above, from a state wherein the head part 6 and the seal member 2 are combined, the trunk portion 6a of the head part 6 is inserted to pass through the inside of the slider 3 from the side of the male joint portion 6b, so that such head part 6 and slider 3 are combined.

Figure 10:
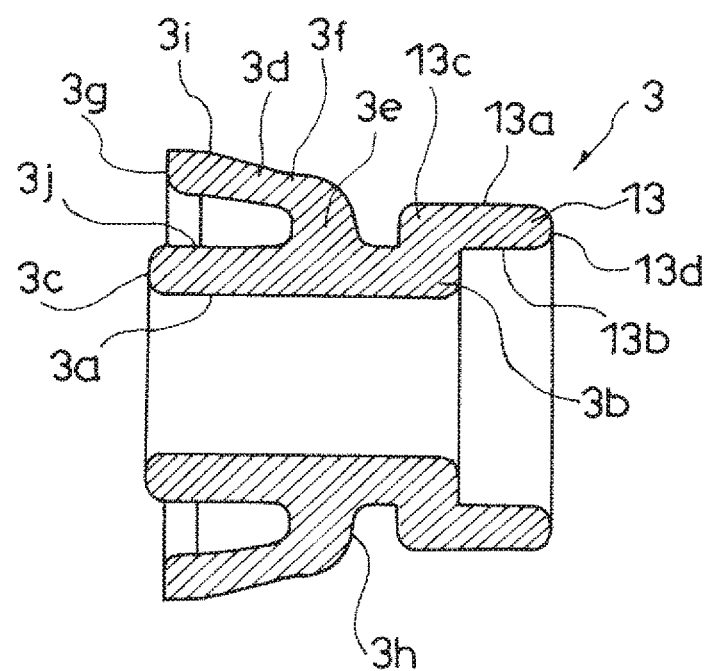
FIG. 10 is a cross-sectional view of the slider forming the piston of the damper.

In the illustrated examples, as shown in FIG. 9 and FIG. 10, the slider 3 is provided with a short cylindrical base 3a wherein an inner frame shape in a cross section orthogonally in the moving direction x of the piston P has a shape which becomes complementary to an outer frame shape in a cross section of the trunk portion 6a of the head part 6 in the same direction; and a lip 3d integrally formed outside the base 3a. In the illustrated example, the lip 3d has a circumferential fin-like member formed in such a way so as to surround the base 3a. The lip 3d has a base portion 3e integrated with an outer face portion of the base 3a between a front end 3b positioned on a seal member 2 side and a back end 3c positioned on the open end 12 side of the housing H in the base 3a, and is provided with an extension portion 3f extending toward the open end 12 side of the housing H from the base portion 3e. A shoulder portion 3h is formed between the base portion 3e and the extension portion 3f. The extension portion 3f has an inclination gradually increasing a distance between the extension portion 3f and the base 3a as moving to a terminal 3g thereof from the shoulder portion 3h.

The seal member 2 and the slider 3 are held between the first flange 4 and the second flange 5 in a state allowing a slight movement along the moving direction x of the piston P. The outer face portion 2c of the seal member 2 contacts the inner wall of the housing H throughout a whole circumference thereof, and the extension portion 3f of the slider 3 contacts the inner wall of the housing H on a terminal 3g side thereof throughout a whole circumference thereof as well. Also, a portion located between the front end 3b of the base 3a of the slider 3 and the base portion 3e of the lip 3d is positioned inside the skirt-shaped portion 2e of the seal member 2, and the shoulder portion 3h of the lip 3d of the slider 3 faces the terminal 2f of the skirt-shaped portion 2e of the seal member 2 (FIG. 2 to FIG. 5).

Then, in the present embodiments, when the braking force is generated, the slider 3 presses the seal member 2, and a portion contacting the inner wall of the housing H in the seal member 2 deforms outwardly toward the housing H.

More specifically, in the illustrated examples, when the braking force is generated, the slider 3 presses the seal member 2, so that the skirt-shaped portion 2e in the seal member 2 deforms outwardly toward the housing H.

In the illustrated examples, when the piston P moves forward in a direction of separating from the blocking end 9 of the housing H, a chamber C formed between the piston P and the blocking end 9 comes to have a negative pressure, thereby generating a resistance due to a pressure change which becomes one portion of the braking force (FIG. 3 and FIG. 4). Also, at that time, the slider 3 makes the seal member 2 to deform as mentioned above to increase a frictional force between the seal member 2 and the housing H, thereby generating a frictional resistance which becomes one portion of the braking force (FIG. 3 and FIG. 4).

In the illustrated examples, when the piston P moves forward, the slider 3 becomes difficult to move in the forward-moving direction due to a shape of the lip 3d, so that the shoulder portion 3h of the slider 3 is pressed against the terminal 2f of the skirt-shaped portion 2e of the seal member 2, and the circumferential projection piece 2g formed in the front end portion 2a of the seal member 2 is firmly attached to the first flange 4 so as to seal between the front end portion 2a and the first flange 4, and the skirt-shaped portion 2e deforms outwardly so as to seal between the outer face portion 2c of the seal member 2 and the inner wall of the housing H (FIG. 3 and FIG. 4). Thereby, in the illustrated example, when the piston P moves forward, ventilation relative to the chamber C is limited to a vent passage formed by a groove 7 (see FIG. 6 and FIG. 7) formed throughout the end portion facing the open end 12 of the housing H in the trunk portion 6a from an edge portion of the first flange 4 in a portion positioned on the cylinder shaft of the housing H in the head part 6 forming the piston P so as to generate the resistance due to the aforementioned pressure change. Also, the skirt-shaped portion 2e of the seal member 2 deforms outwardly as described above so as to generate the aforementioned frictional resistance. Namely, the slider 3 is provided with a pressure contact portion pressed against the seal member 2 from the rod 1 side, and in the illustrated examples, the shoulder portion 3h functions as the pressure contact portion.

In the present embodiments, in accordance with an operation speed of the piston P, a deformation amount of the seal member 2 increases. From another point of view, in accordance with the operation speed of the piston P, a sliding amount of the slider 3 increases. Therefore, the damper according to the embodiments is a damper with a speed response type changing the braking force in accordance with a moving speed of a subject to be braked, which becomes the subject to be braked, or a load response type.

When all or most of the braking force is covered by the resistance due to the aforementioned pressure change, the braking force is small at the time of starting the operation of the piston, and when the operation advances, the braking force rapidly increases. Consequently, in such a method, in some cases, there may be caused situations wherein the subject to be braked halts in a moving process, and moreover, starts to unexpectedly move backward toward a position before the movement from a middle of the movement so as to be difficult to properly control the movement of the aforementioned subject to be braked in a whole process thereof.

On the other hand, in the damper according to the embodiments, the braking force is covered by the resistance due to the pressure change and the frictional resistance so as to properly control the movement of the subject to be braked in the whole process thereof. Namely, the damper according to the embodiments can prevent the situations wherein the subject to be braked halts in a moving process, and moreover, starts to unexpectedly move backward toward the position before the movement from the middle of the movement as little as possible. Also, the damper according to the embodiments can easily generate an intended braking force even if a cross-sectional area of the housing H is made small so as to have a characteristic which can easily reduce a size and thickness.

Figure 5:
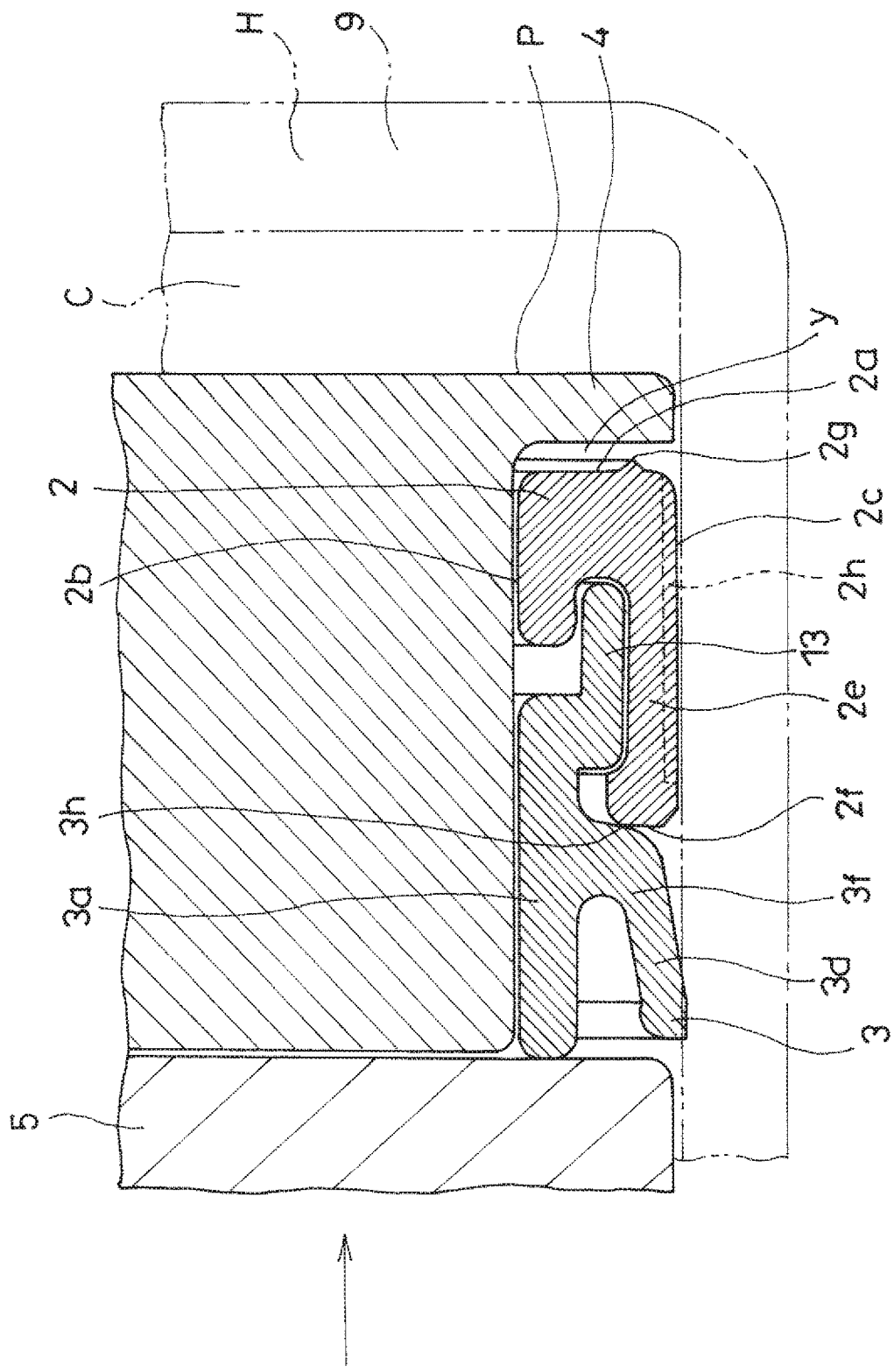
FIG. 5 is an enlarged cross-sectional structural view of the essential parts of the damper, and shows a state when the piston moves backward.

On the other hand, in the illustrated examples, when the piston P moves backward in a direction of approaching the blocking end 9 of the housing H, the chamber C is difficult to have a positive pressure, and at that time, the aforementioned frictional resistance becomes small as well (FIG. 5). In the illustrated examples, when the piston P moves backward, the seal member 2 and the slider 3 move to a second flange 5 side to form a gap y between the first flange 4 and the front end portion 2a of the seal member 2, and due to the shape of the lip 3d, the slider 3 can easily move in a backward-moving direction of the piston P, so that the slider 3 is not pressed against the seal member 2, and the frictional resistance between the seal member 2 and the inner wall of the housing H does not increase as well. In addition to the vent passage formed by the groove 7, the chamber C is communicated through the gap y between the first flange 4 and the front end portion 2a of the seal member 2, and between the seal member 2 and the inner wall of the housing H as well. Thereby, in the illustrated example, a large force is unnecessary for a backward movement of the piston P. Also, since the vent passage of the chamber C is expanded simultaneously when the piston P starts to move backward, a situation wherein the subject to be braked moves backward toward the position before the movement from the middle of the movement does not occur.

Also, in the present embodiment, as shown in FIG. 3 to FIG. 5, when the braking force is generated, on an inner side of the portion contacting the inner wall of the housing H in the seal member 2, i.e. on an inner side of the skirt-shaped portion 2e, there is provided a deformation control portion 13 which suppresses a deformation of the seal member 2 inwardly toward the housing H.

Figure 13:
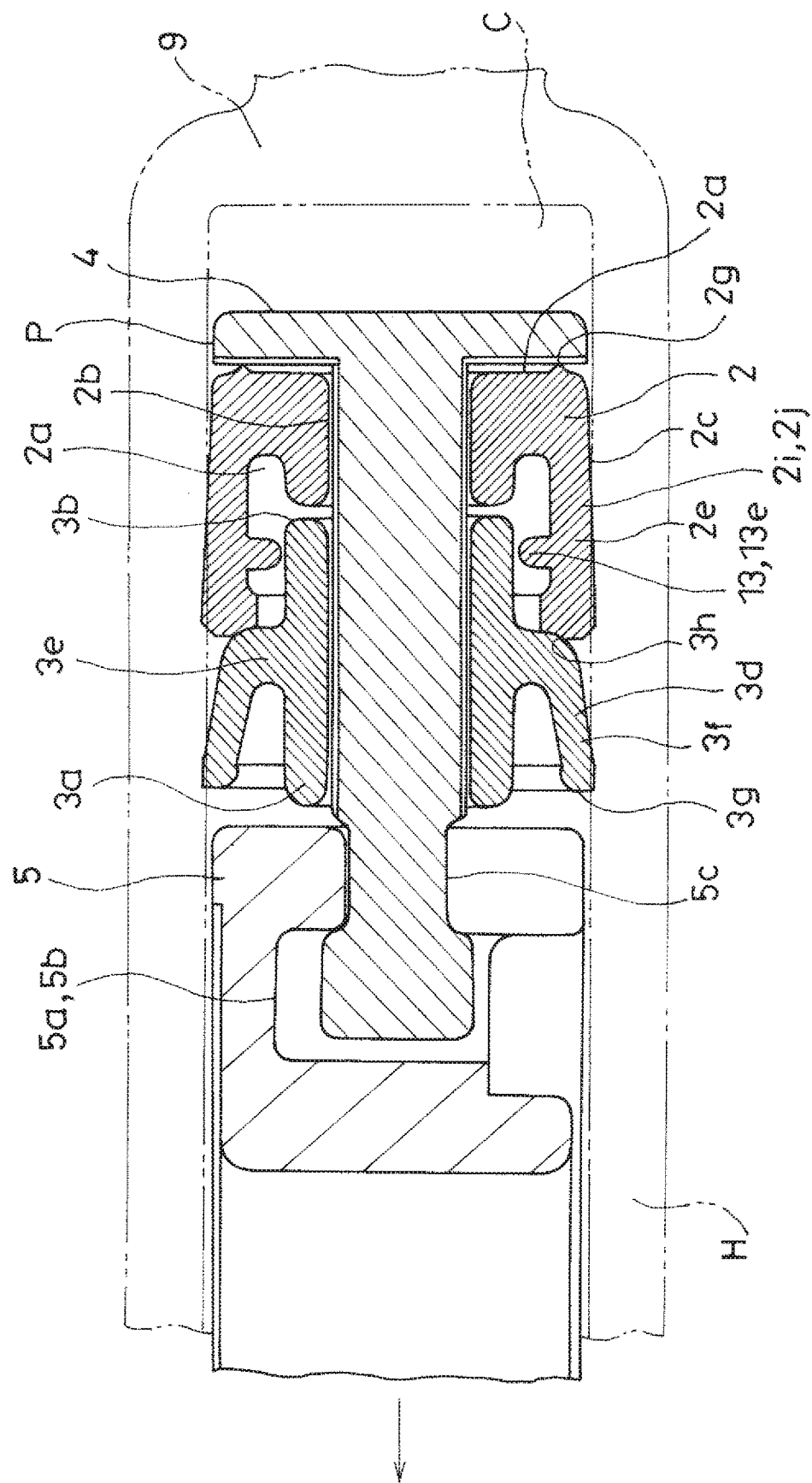
FIG. 13 is a cross-sectional structural view showing a modified example provided with a deformation control portion on a seal member side.
Figure 14:
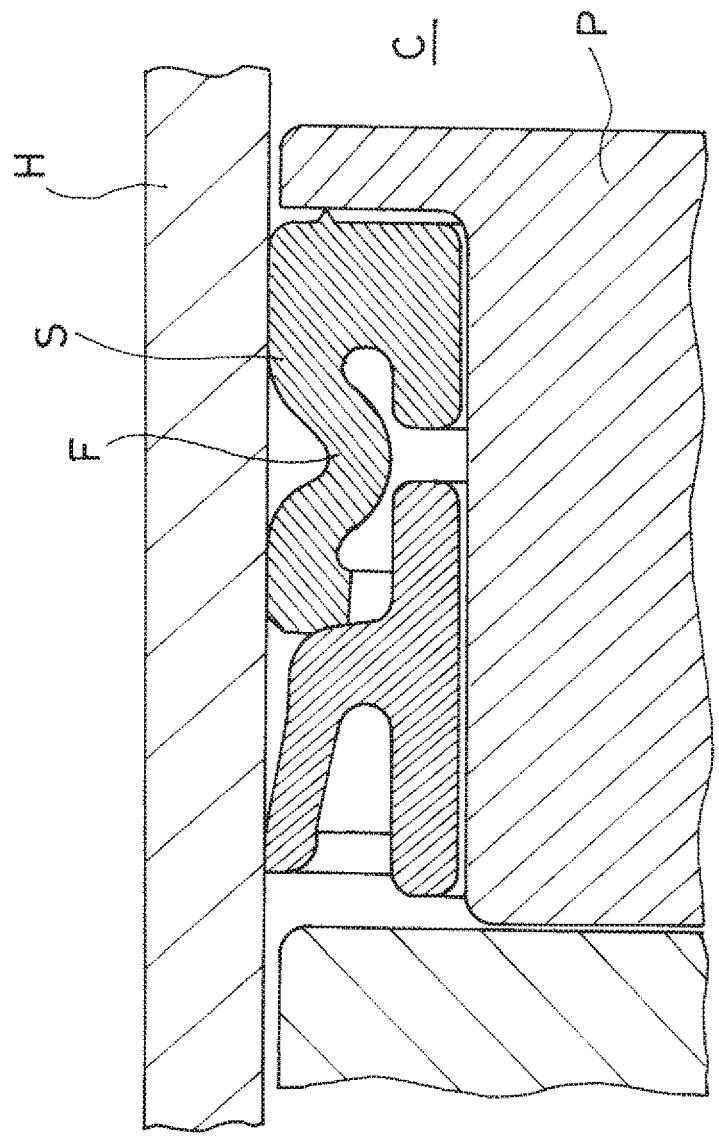
FIG. 14 is a cross-sectional structural view showing a state wherein a problem arises in a conventional example.

The deformation control portion 13 contacts at least at a position 2j which becomes a center in a direction along the moving direction of the piston in a portion 2i contacting the inner wall of the housing H of the seal member 2 at a time of the deformation so as to suppress the deformation (see FIG. 3 and FIG. 13).

In the example shown in FIG. 1 to FIG. 8, the deformation control portion 13 is integrally provided with the slider 3. The deformation control portion 13 has a short flat cylindrical shape. An outer face 13a of the deformation control portion 13 is positioned on an inner side than on an outer face 3i of a lip 3d, and between the outer face 3i of the lip 3d and the outer face 13a of the deformation control portion 13, and there is formed a distance slightly larger than a thickness (an inner and outer dimension) of the skirt-shaped portion 2e of the seal member 2. In a state wherein the skirt-shaped portion 2e does not deform inwardly toward the housing H, the outer face 13a of the deformation control portion 13 does not contact the skirt-shaped portion 2e. As shown in FIG. 3, an inner face 13b of the deformation control portion 13 is positioned substantially on the same face as an outer face 3j of the base 3a. One cylinder end 13c of the deformation control portion 13 is integrated with the front end 3b of the base 3a of the slider 3. Between one cylinder end 13c of the deformation control portion 13 and the shoulder portion 3h, there is formed a gap where a circumferential rising portion 2k formed on an inner face of the terminal 2f of the skirt-shaped portion 2e can be housed. Also, another cylinder end 13d of the deformation control portion 13 is positioned inside the circumferential groove 2d of the seal member 2.

As shown in FIG. 3, when the braking force is generated, the portion 2i contacting the inner wall of the housing H in the seal member 2 is formed by the skirt-shaped portion 2e, and extends to a forward-moving end side of the piston P, i.e. toward the open end 12 side of the housing H, so that in a case without the deformation control portion 13, there is a case of generating a buckling in which the inner side of the housing H is an outside of bending. Such buckling easily occurs when a high load acts on the piston P, and such buckling easily occurs when the outer frame shape in the cross section of the housing H in the direction orthogonal to the moving direction x of the piston P is made flat. When such buckling occurs, a seal property between the seal member 2 and the housing H is reduced, and ventilation to the chamber C cannot be controlled. Also, a frictional force to the inner wall of the housing H of the seal member 2 is reduced, so that a rapid reduction of the braking force of the damper occurs. Typically, in a case wherein such buckling occurs, the subject to be braked repeats rapid movement and halt, alternately.

In the present embodiments, by the deformation control portion 13, when the braking force is generated, an inward deformation of the portion 2i contacting the inner wall of the housing H in the seal member 2 can be suppressed so as to continue to provide a uniform braking force through an entire movement thereof relative to the subject to be braked.

Figure 11:
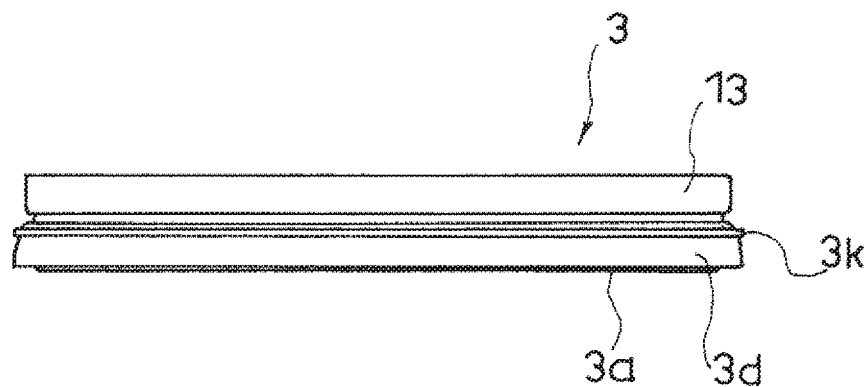
FIG. 11 is a side view of a modified example of the slider.
Figure 12:
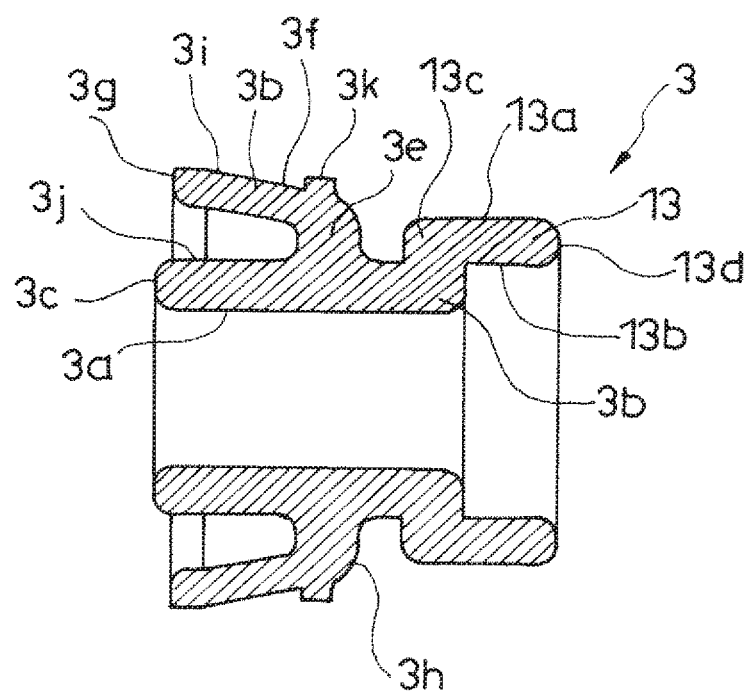
FIG. 12 is a cross-sectional view of the slider according to the modified example in FIG. 11.

FIG. 11 and FIG. 12 show an example with a circumferential projecting piece 3k projecting toward an inner wall side of the housing H in the base portion 3e of the lip 3d of the slider 3 forming the damper shown in FIG. 1 to FIG. 10.

In an example shown in FIG. 13, the deformation control portion 13 is integrally provided with the seal member 2. In the example, the deformation control portion 13 is formed by a circumferential projecting piece 13e formed at the position 2j which becomes the center in the direction along the moving direction of the piston in the portion 2i contacting the inner wall of the housing H of the seal member 2. More specifically, in the example, there is formed the circumferential projecting piece 13e between the terminal 2f of the skirt-shaped portion 2e in the seal member 2 and the base portion 3e of the lip, and on an inner face of the skirt-shaped portion 2e. In the state wherein the skirt-shaped portion 2e does not deform inwardly toward the housing H, the circumferential projecting piece 13e does not contact an outer face of the base of the slider.

Although it is omitted in the drawings, the deformation control portion 13 may be formed physically independently from the seal member 2 and the slider 3. In that case, the deformation control portion 13 is formed as a flat annular member interposed between the skirt-shaped portion 2e of the seal member 2 and the base 3a of the slider 3.

Incidentally, obviously, the present invention is not limited to the embodiments explained above, and the embodiments include all embodiments which can obtain the object of the present invention.

EXPLANATION OF SYMBOLS

P a piston
H a housing
1 a rod
13 a deformation control portion
2 a seal member
2i a portion contacting an inner wall of the housing H
3 a slider Incidentally, all contents of the specification, claims, drawings, and abstract of Japanese Patent Application No. 2016-209386 filed on Oct. 26, 2016 are cited in their entireties herein and are incorporated as a disclosure of the specification of the present invention.

What is claimed is:
1. A damper comprising:
a piston provided with a rod, and
a housing storing the piston, and generating a braking force by an operation of the piston,
wherein the piston includes a seal member relative to an inner wall of the housing, a slider situated adjacent the seal member and contacting the inner wall of the housing with a predetermined frictional force, such that when the braking force is generated, the slider presses against the seal member, so that a portion contacting the inner wall of the housing in the seal member deforms toward an outside of the housing, and a deformation control portion, the seal member includes a front end portion, an inner face portion extending from the front end portion, an outer face portion extending from the front end portion to be situated outside the inner face portion and contacting the inner wall of the housing, and a circumferential groove formed between the inner face portion and the outer face portion, the slider includes a cylindrical base, and a lip extending outwardly from a middle of the cylindrical base and surrounding the cylindrical base, and the deformation control portion includes a cylinder end extending outwardly from the cylindrical base of the slider so that the deformation control portion is located in the circumferential groove inside the outer face portion of the seal member, and suppresses a deformation of the seal member toward an inside of the housing.

2. A damper according to claim 1, wherein the deformation control portion suppresses the deformation by contacting the outer face portion of the seal member at a time of the deformation.

3. A damper according to claim 1, wherein the deformation control portion is integrally provided with the slider.

4. A damper according to claim 1, wherein an outer frame shape in a cross section of the housing in a direction orthogonal to a moving direction of the piston is made flat.

5. A damper according to claim 1, wherein the outer face portion of the seal member includes a circumferential rising portion extending toward the rod and situated in a gap between a cylinder end of the deformation control portion and a shoulder portion of the lip of the slider.

6. A damper comprising:
a piston provided with a rod, and
a housing storing the piston, and generating a braking force by an operation of the piston,
wherein the piston includes a seal member relative to an inner wall of the housing, a slider situated adjacent the seal member and contacting the inner wall of the housing with a predetermined frictional force, such that when the braking force is generated, the slider presses against the seal member, so that a portion contacting the inner wall of the housing in the seal member deforms toward an outside of the housing, and a deformation control portion, the seal member includes a front end portion, an inner face portion extending from the front end portion, an outer face portion extending from the front end portion to be situated outside the inner face portion and contacting the inner wall of the housing, and a circumferential groove formed between the inner face portion and the outer face portion, the slider includes a cylindrical base, and a lip extending outwardly from a middle of the cylindrical base and surrounding the cylindrical base, and the deformation control portion is integrally formed with the outer face portion of the seal member and extends toward the cylindrical base so that the deformation control portion suppresses a deformation of the seal member toward an inside of the housing.

7. A damper according to claim 6, wherein the outer face portion of the seal member includes a circumferential rising portion extending toward the rod to support a shoulder portion of the lip of the slider.

* * * * *